United States Patent
Hayabuchi et al.

(10) Patent No.: US 7,017,724 B2
(45) Date of Patent: Mar. 28, 2006

(54) CLUTCH ASSEMBLY

(75) Inventors: Masahiro Hayabuchi, Anjo (JP); Kouji Maeda, Anjo (JP); Tomohiro Yamashita, Anjo (JP); Masahiro Yamaguchi, Tkefu (JP); Yoshito Takeshita, Tkefu (JP); Katsunori Tanaka, Tkefu (JP); Yukihiro Fukuda, Tkefu (JP)

(73) Assignees: Aisin AW Co., LTD, Aichi-ken (JP); Aisin AW Industries Co., LTD, Fukui (JP)

(*) Notice: Subject to any disclaimer, the term of this patent is extended or adjusted under 35 U.S.C. 154(b) by 0 days.

(21) Appl. No.: 10/450,569

(22) PCT Filed: Sep. 10, 2003

(86) PCT No.: PCT/JP02/08248

§ 371 (c)(1),
(2), (4) Date: Aug. 13, 2002

(87) PCT Pub. No.: WO03/016736

PCT Pub. Date: Feb. 27, 2003

(65) Prior Publication Data

US 2004/0050647 A1 Mar. 18, 2004

(30) Foreign Application Priority Data

Aug. 14, 2001 (JP) .............................. 2001-246276
Aug. 14, 2001 (JP) .............................. 2001-246277

(51) Int. Cl.
*F16D 13/52* (2006.01)
*B60K 17/00* (2006.01)

(52) U.S. Cl. .............................. 192/70.17; 192/48.92; 192/85 AA; 192/213.2

(58) Field of Classification Search ............. 192/213.2, 192/48.92, 55.61, 70.17, 85 AA, 91 A, 109 A, 192/109 F, 213
See application file for complete search history.

(56) References Cited

U.S. PATENT DOCUMENTS 6,244,401 B1 * 6/2001 Maienschein et al. ....... 192/3.3
6,332,521 B1 * 12/2001 Shoji ........................ 192/55.61

(Continued)

FOREIGN PATENT DOCUMENTS

JP          61-189330          8/1986

(Continued)

OTHER PUBLICATIONS

Microfilm of the specification and drawings annexed to the request of Japanese Utility Model Application No. 61461/1988 (Laid-open No. 165333/1989) (Toyota Motor Corp.), Nov. 22, 1989, Full text; Fig. 3.

(Continued)

*Primary Examiner*—Saul Rodriguez
(74) *Attorney, Agent, or Firm*—Sughrue Mion, PLLC (57) ABSTRACT

A clutch assembly for starting a vehicle without using a torque converter has a simple structure yet providing high reliability. In the clutch assembly, a clutch and a damper device are housed in a housing connected to a crank shaft of an engine. A boss serving as an output member is connected to an input shaft of an automatic transmission. An output of the engine is connected/disconnected to/from the input shaft upon engagement/disengagement of the clutch. The clutch includes a friction member and a piston fit oil tightly with the housing so as to apply pressure to the friction member. One end of the damper device is connected to a clutch hub, and the other end is connected to the output member. The clutch and the damper device are aligned on the axis of the housing.

29 Claims, 4 Drawing Sheets

U.S. PATENT DOCUMENTS 6,397,996 B1 * 6/2002 Yabe .................. 192/55.61
6,446,779 B1 * 9/2002 Yabe .................. 192/213
6,648,117 B1 * 11/2003 Shoji et al. .......... 192/55.61

FOREIGN PATENT DOCUMENTS

| JP | 5-16143 | 6/1993 |
| JP | 08-320030 | 12/1996 |
| JP | 09-177830 | 7/1997 |
| JP | 9-184520 | 7/1997 |
| JP | 2000-304065 | 10/2000 |
| JP | 2001-3955 | 1/2001 |

OTHER PUBLICATIONS

Microfilm of the specification and drawings annexed to the request of Japanese Utility Model Application No. 18946/1988 (Laid-open No. 122537/1989) (Daikin Manufacturing Co., Ltd.), Aug. 21, 1989, Full text; Fig. 1.

* cited by examiner

CLUTCH ASSEMBLY

FIELD OF THE INVENTION

The present invention relates to a clutch assembly interposed between an engine and an automatic transmission of a vehicle, and more particularly, to a clutch assembly including a clutch and a damper device.

BACKGROUND OF THE INVENTION

Generally, a hydraulic power transmission, such as a torque converter and a fluid coupling, is employed as a clutch assembly of a vehicle. In the case where the hydraulic power transmission is employed in the vehicle having an internal combustion engine that keeps the drive source in an operating state, even if the vehicle is stopped, the fluid supplied from the hydraulic power transmission allows a relative rotation between an input shaft of the automatic transmission and an output shaft of the engine so as to keep the operation of the drive source. The fluid of the hydraulic power transmission, thus, allows the vehicle to have a smooth take-off and power of the engine is transmitted to the input shaft of the automatic transmission.

The aforementioned hydraulic power transmission or the torque converter allows the vehicle to have a good automatic take-off performance owing to the relative rotation between the input and output members, and slip function. The required size of the hydraulic power transmission, however, becomes relatively large. This may interfere with reduction in weight and size of the vehicle. As a lock-up clutch is employed to prevent a power loss that generally occurs during power transmission through the fluid, the structure of the hydraulic power transmission may become further complicated. Even if the lock-up clutch is employed for the aforementioned reason, it cannot eliminate all the power loss.

The demand for the torque converter to increase the torque ratio or provide a shock absorbing function of the fluid upon shifting has been decreased owing to the increase in the shift speeds of the automatic transmission and further development of the continuously variable transmission (CVT). Instead the clutch assembly using no fluid has been proposed in response to the demand for reducing weight and size of the automatic transmission.

For example, Japanese Patent Laid-Open Publication No. 2001-3955 discloses that the clutch assembly has a housing connected to an internal combustion engine, where a multiple disc clutch, a damper device and a one-way clutch are housed therein. When the vehicle is stopped, the multiple disc clutch is connected by a pressure spring so as to generate a predetermined creep force. When the vehicle is about to take off, the multiple disc clutch is engaged under pressure of a piston upon supply of an oil pressure to an oil chamber. The driving force of the engine is then transmitted to the input shaft while the impact being absorbed by the damper device. Further the one-way clutch serves to prevent the vehicle from moving backward upon running uphill.

The aforementioned clutch assembly has a clutch case serving as an output member and a hub serving as an input member in the housing such that a wet-type multiple disc clutch is formed by interposing a plurality of friction plates between the clutch case and the hub. The piston that presses the clutch is fit oil tightly with the clutch case and an outer race of the one-way clutch via O-rings, respectively. An oil pressure is supplied between the outer race and the clutch case from an oil hole formed in the input shaft to the oil chamber defined by the piston and the clutch case.

The aforementioned clutch assembly has a housing that constitutes an outer frame of the clutch assembly, in which the clutch case for the clutch is provided as well as the oil chamber. The reaction force of the clutch against the pressure acts on the clutch case, and the force in the axial direction is generated between the housing and the elements housed in the clutch case. In this case, a thrust bearing and the like has to be provided for the purpose of bearing the axial force (thrust). As the oil chamber is defined by the clutch case housed in the housing and the outer race, the oil passage through which the oil pressure is supplied/discharged between the input shaft and the oil chamber requires at least two oil seals interposing the oil hole formed in the input shaft.

In the generally employed clutch assembly, the oil chamber and the clutch are provided in the clutch case housed in the housing. The structure of the clutch assembly becomes complicated because of the needs for providing the thrust bearing and the oil passage in addition to the clutch case itself, thus degrading reliability of the clutch assembly.

Additionally, the damper device is disposed on an outer periphery in the radial direction of the multiple disc clutch. As a result, the radial size of the clutch assembly is increased. Especially when two springs for the damper device are provided in the radial direction for improving the damper performance, the radial size of the clutch may further be increased, thus deteriorating ease of mounting the clutch assembly on the vehicle.

SUMMARY OF THE INVENTION

It is an object of the present invention to provide a clutch assembly that allows a vehicle to take off without using a hydraulic power transmission such as a torque converter while having a simple structure in which neither oil chamber nor a clutch is disposed in a clutch case housed in a housing, thus improving reliability.

It is another object of the present invention to provide a clutch assembly that has a reduced radial size so as to improve ease of mounting the clutch assembly on the vehicle.

In a clutch assembly including a clutch and a damper device housed in a housing that is connected to an engine output member, and an output member connected to an input shaft of an automatic transmission, and performing connection and disconnection of an output of an engine fed to the input shaft of the automatic transmission by engaging and disengaging the clutch as claimed in claim 1, the clutch includes a first friction member, a second friction member, and a piston that is oil tightly fit with the housing so as to apply pressure to the first and the second friction members; and the damper device axially aligned with the clutch and having one end connected to a clutch hub that supports the second friction member and another end connected to the output member.

According to at least one example of the present invention, the vehicle can be started through transmission of an output of the engine to an input shaft of the automatic transmission by connecting/disconnecting the clutch without using the torque converter (T/C). This makes it possible to eliminate the slip between the input/output members as caused in the case where the T/C is employed, thus improving the transmission efficiency. In at least one example of the present invention, as an oil chamber is defined by fitting a piston of the clutch oil tightly with the housing, an oil leakage from the oil chamber to the housing can be prevented, further improving controllability of the clutch. The invention provides the clutch assembly having a simple structure by eliminating the clutch case for storing the clutch and the hydraulic actuator, as being separated from the housing, resulting in high reliability. As the damper device is aligned with the clutch with respect to the axial direction, a position of the damper spring can be freely determined in the radial direction of the damper device. This makes it possible to increase the degree of freedom in designing the damper device.

A clutch assembly, according to at least another example of the invention, includes a clutch and a damper device housed in a housing that is connected to an engine output member, and an output member connected to an input shaft of an automatic transmission and having both sides directly supported on the housing via a bearing, and a take-off controller that transmits an output of the engine to the automatic transmission by engaging the clutch so as to start a vehicle. In the clutch assembly, the damper device includes a drive plate connected to an output member of the clutch, a driven plate connected to the output member, a first spring functioning in a serial manner between the drive plate and the driven plate, and a second spring functioning between the drive plate and the driven plate with a predetermined allowance, and the first spring is disposed at an inner radial side of the damper device with respect to the second spring; and the damper device including the first and the second spring arranged in the radial direction is aligned with the clutch in an axial direction.

In the clutch assembly, according to at least another example of the invention, the clutch and the damper device are aligned in the axial direction. This makes it possible to prevent the clutch assembly from becoming unnecessarily large-sized in the radial direction in spite of the first and second springs disposed for providing damper function. The resultant mountability of the clutch assembly to the vehicle, thus, may be improved.

DETAILED DESCRIPTION OF THE EMBODIMENT

Figure 1:
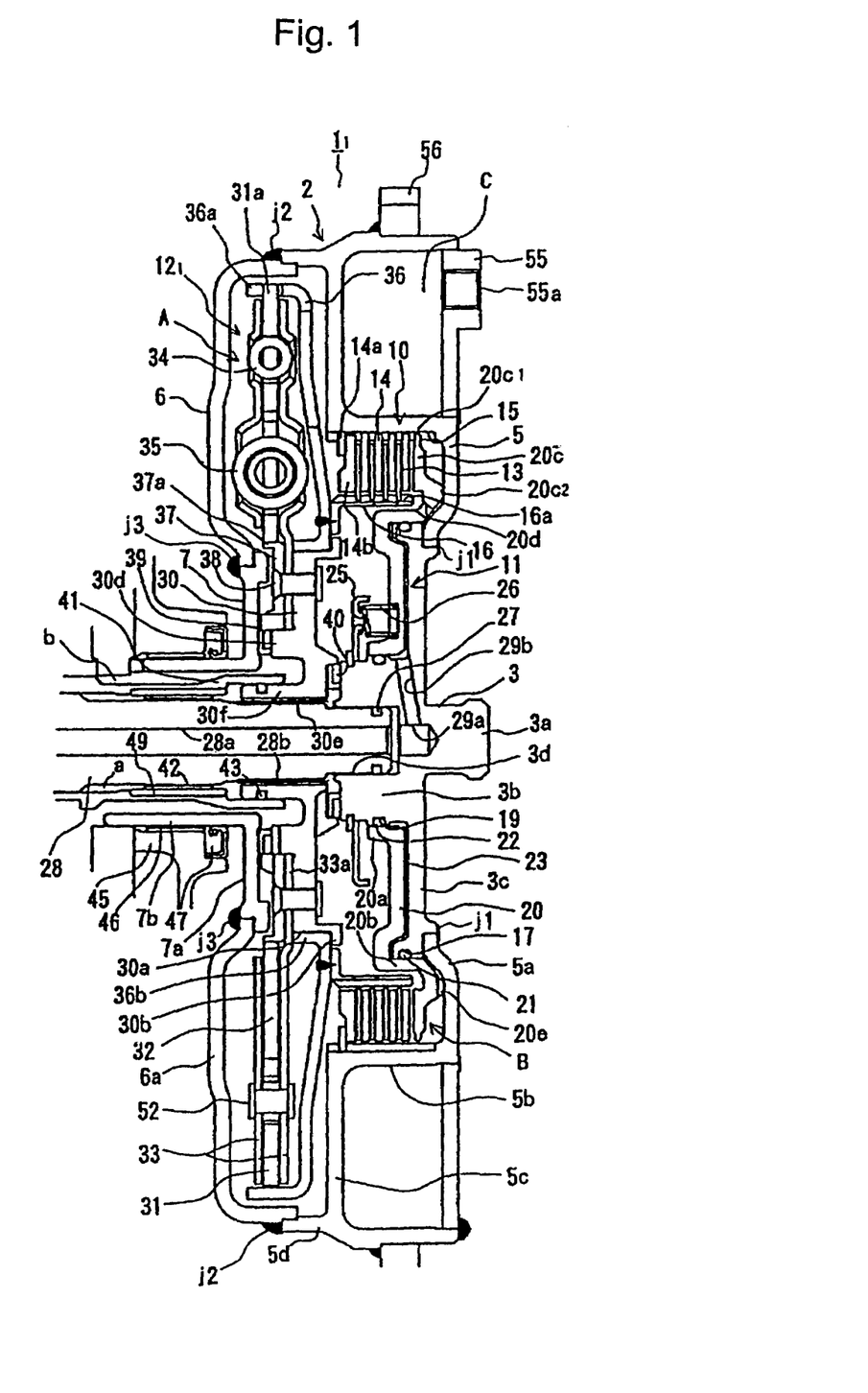
FIG. 1 is a sectional view of a clutch assembly to which the present invention is applied, in which no one-way clutch is provided.
Figure 2:
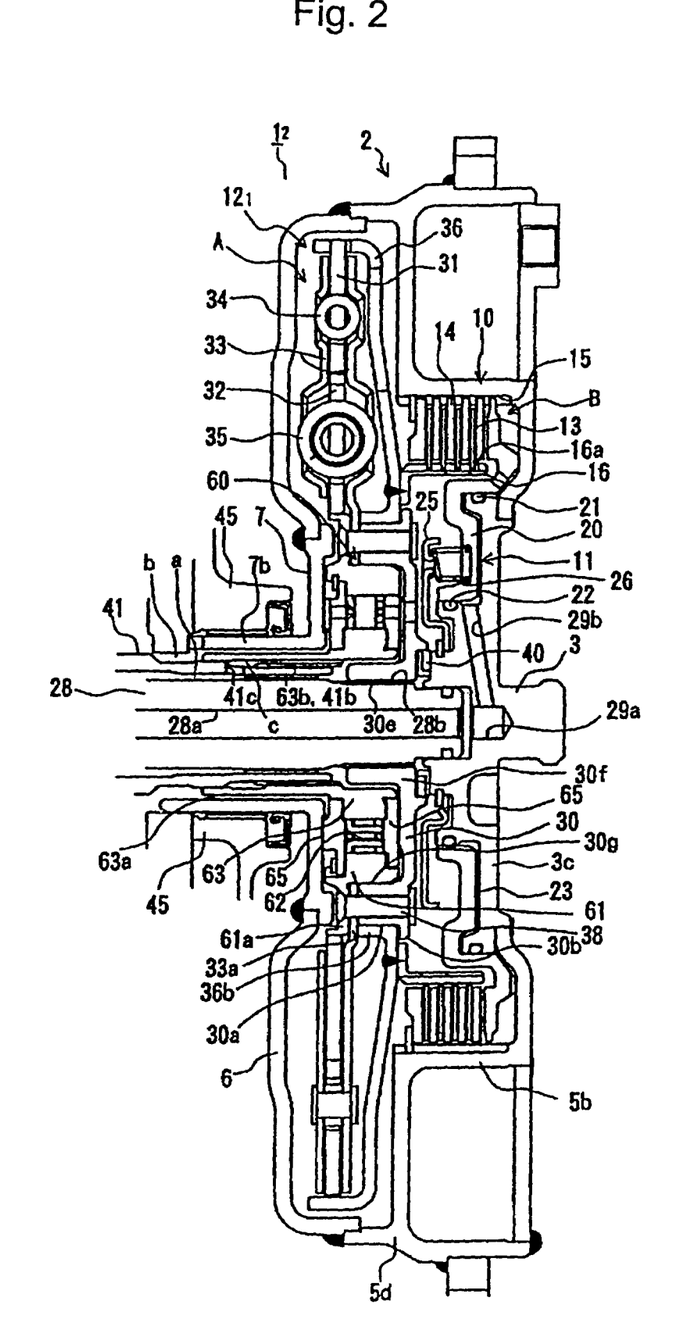
FIG. 2 is a sectional view of a clutch assembly to which the present invention is applied, in which a one-way clutch is provided.
Figure 4:
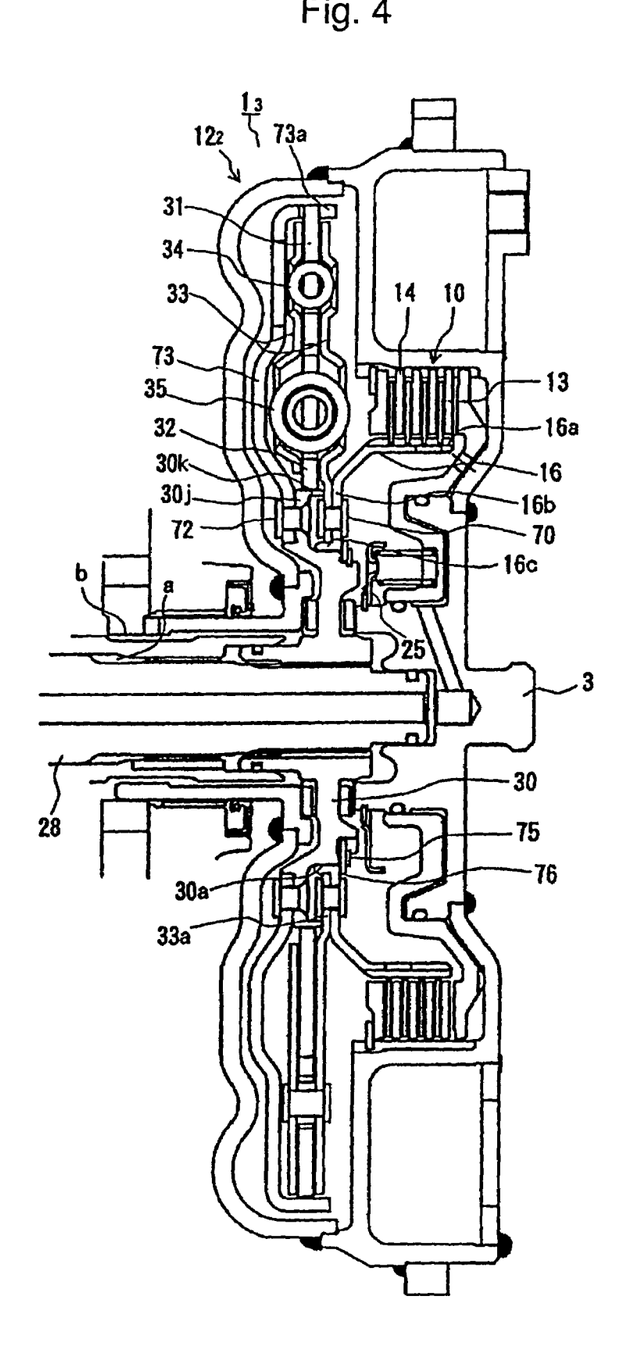
FIG. 4 is a sectional view of a clutch assembly that has been partially modified.

An embodiment of the present invention will be described referring to the drawings. FIG. 1 shows a clutch assembly with no one-way clutch. FIG. 2 shows a clutch assembly with a one-way clutch. FIG. 4 shows a clutch assembly as a modified embodiment in which an input or a drive member and an output or a driven member of the damper device are reversed. The clutch assembly is connected to an internal combustion engine such as a gasoline engine to the right of the drawings, and connected to an automatic transmission, for example, a CVT, an automatic transmission with multiple speeds (6 forward speeds and 1 reverse speed) and the like to the left of the drawings. The clutch assembly has a clutch controller that engages the clutch 10 (described later) to transmit outputs of the engine to the automatic transmission such that the vehicle takes off.

Referring to FIG. 1, a clutch assembly $1_1$ includes a housing 2 that forms an outer frame of the clutch assembly $1_1$. The housing 2 is formed by bonding a center piece 3, a front cover 5, a rear cover 6 and a rear hub 7 altogether by welding and the like. The center piece 3 and the front cover 5 are bonded at a welded point j1. The front cover 5 and the rear cover 6 are bonded at a welded point j2. The rear cover 6 and the rear hub 7 are bonded at a welded point j3. The front cover 5 constitutes a first housing member. The center piece 3, the rear cover 6 and the rear hub 7 constitute a second housing member.

The center piece 3 includes a protruding portion 3a that fits with a crank shaft (not shown) or an engine output member of the engine, a hub 3b, and a disc portion (front side surface) 3c having a flat surface extending toward the outer radial direction. The front cover 5 includes a front side surface 5a welded to an outer peripheral surface of the disc portion 3c, an intermediate cylindrical portion 5b that bends at substantially 90 degrees with respect to the front side surface 5a and extends in an axial direction, a bent portion 5c that bends at substantially 90 degrees with respect to the rear end portion of the cylindrical portion toward the outer radial direction, and an outer peripheral portion 5d that extends in substantially an axial direction from an outer periphery of the bent portion 5c. The rear cover 6 is welded to an end of the outer peripheral portion 5d of the front cover 5, and includes a rear side surface 6a formed into an arm-like shape. The rear hub 7 includes a disc portion 7a welded to an inner periphery of the rear surface 6a, and a cylindrical portion 7b that bends at 90 degrees with respect to the inner periphery of the disc portion 7a, and extends in the axial direction. The intermediate cylindrical portion 5b may be separated from the front cover such that they are joined by welding.

A clutch 10 and a damper device $12_1$ are housed in the housing 2. The clutch 10 includes a wet-type multiple disc clutch in which a plurality of clutch plates (first friction members) 14 and clutch discs (second friction members) 13 are alternately disposed in the axial direction, and a hydraulic actuator 11 including a piston 20 (to be described later) and a cylinder for operating the clutch. A spline 15 is directly formed on the inner peripheral surface of the intermediate cylindrical portion 5b of the front cover 5. The spline 15 is brought into engagement with the clutch plates 14 as the outer friction plates so as to be fastened with a snap ring 14a. A cylindrical clutch hub (clutch output member) 16 is disposed at an inner diameter side of the intermediate cylindrical portion 5b. A spline 16a formed on the outer peripheral surface of the clutch hub 16 is engaged with the clutch discs 13 as inner friction plates. In this embodiment, the spline 15 is directly formed on the inner peripheral surface of the intermediate cylindrical portion 5b so as to form a clutch drum directly on the front cover 5. However, the clutch drum as being a separate element may be welded to the front cover 5 into one body.

The center piece 3 has an annular groove 17 on an outer circumference of the disc portion 3c located inside of the front cover 5, and an annular groove 19 on an outer circumference of the hub portion 3b. The piston 20 is oil tightly fit with the aforementioned annular grooves 17, 19 via O-rings 21, 22, respectively. An oil chamber 23 that constitutes the hydraulic actuator 11 is defined by the piston 20 and the cylinder including the disc portion 3c and the hub portion 3b. The oil chamber 23 defined by the piston 20 and the housing 2 is disposed so as to be overlapped with the clutch plates 14 and the clutch discs 13 in the axial direction at the inner peripheries (inner radial side) thereof. The piston 20 has a collar 20a that protrudes such that the inner periphery (inner radial side) thereof locates rearward in the axial direction (at the transmission side, inward of the housing). The O-ring 22 is slidably in contact with the inner peripheral surface of the collar 20a. The piston 20 further has an outer periphery bent to protrude frontward in the axial direction (at the engine side, outward of the housing). The O-ring 21 is slidably in contact with the inner peripheral surface of the cylindrical portion 20b. The oil chamber 23 may be defined by the piston 20, the disc portion 3c, the hub portion 3b, and the intermediate cylindrical portion 5c.

The piston 20 extends to constitute a clutch operating portion. An end $20c_1$ of a projecting portion 20c as the clutch operating portion is engaged with the spline 15 such that the piston is locked. The projecting portion 20c has a protrusion $20c_2$ in the intermediate portion that abuts against the inner peripheral surface of the front surface 5a of the front cover 5. As a result, the position where the piston 20 makes a thrust (clutch is disengaged) is determined. As there is no projecting portion for the aforementioned positioning in the oil chamber 23 of the piston 20, the whole surface of the piston in the oil chamber 23 becomes an effective area to bear the pressure upon start of the oil pressure supply from the position where the piston is retracted. This makes it possible to start operation of the piston quickly. The projecting portion 20c has a hole 20d for discharging oil, and a concave groove 20e.

A retainer plate 25 is fastened to the hub portion 3b of the center piece 3 with a snap ring. A return spring 26 is set under pressure between the retainer plate 25 and the back surface of the piston 20. The center piece 3 has a concave portion 3d formed at the side of the hub portion 3b such that an input shaft 28 of the automatic transmission is fit in the concave portion 3d. The input shaft has an oil hole 28a formed therethrough in the axial direction. The oil hole 28a is opened at the end of the input shaft. An O-ring 27 as a sealing device is fit between the input shaft and the concave portion 3d of the center piece 3.

The center piece 3 has an oil hole 29a that pierces therethrough from the concave portion 3d and an oil hole 29b that is formed between the oil hole 29a and a corner of the hub portion 3b such that a hydraulic pressure from the oil hole 28a formed in the input shaft 28 is introduced from the opening of the oil hole 28a into the oil chamber 23 via the oil holes (oil passages) 29a, 29b. In this case, as the opening of the oil hole 28a of the input shaft is led to the oil hole 29a formed in the center piece 3, only one O-ring 27 between the input shaft 28 and the center piece 3 is required. As a result, the blocked portion of the center piece requires no sealing device, thus simplifying the structure of the oil passage.

Meanwhile, a boss 30 serving as an output side of the clutch assembly $1_1$ (output member) is spline coupled with the input shaft 28, and a damper device $12_1$ is housed in a large-diameter storage portion A defined by the bent portion 5c and the rear cover 6 at the outer radial side of the boss 30. The clutch 10 including the hydraulic actuator 11 is stored in a small-diameter storage portion B at the inner radial side of the intermediate cylindrical portion 5b of the front cover. The damper device $12_1$ has a drive plate 31, an intermediate plate 32, two driven plates 33, and two kinds of coil springs 34, 35 located on different radial positions, respectively such that the drive plate and the intermediate plate are interposed between the driven plates.

The large-diameter storage portion A to the front of the damper device $12_1$ has a connection plate (input member) 36 therein. The connection plate 36 has an annular disc-like shape and is integrally formed with the clutch hub 16 through welding on the outer surface near the center. The outer periphery of the connection plate 36 is axially bent into a collar, on which a comb-like notch 36a is formed. The connection plate 36 is connected to the drive plate 31 by engaging the notch 36a with the outer periphery 31a having concave/convex surface of the drive plate 31. The inner periphery of the connection plate 36 constitutes a cylindrical hub portion 36b that is slidably supported on the outer periphery 30a of the boss 30. An extending portion 33a of the driven plate 33 is held by a ring member (ring portion) 37 so as to be integrally fixed with a rivet 38 to the boss 30. A collar (protruding) portion 30b that protrudes toward outer radial direction is formed to the front of the outer periphery of the boss 30. The axial orientation of the hub portion 36b of the connection plate 36 is defined between the collar portion 30b and the extending portion 33a. That is, the connection plate 36 abuts on the outer periphery (support portion) 30a of the boss 30 and is supported by the extending portion 33a (restricting member) of the driven plate and the collar portion 30b that restricts its axial movement. The ring member 37 fixed to the boss has a short collar portion 37a on the outer periphery. The inner periphery of the intermediate plate 32 abuts on the collar portion so as to support the intermediate plate 32 and the drive plate 31.

The boss 30 has a protrusion 30d that is formed on the side surface of the intermediate portion and protrudes rearward. A thrust bearing 39 is interposed between the protrusion 30d and the rear side surface 7a of the rear hub 7. Further a thrust bearing 40 is interposed between the front side surface of the boss 30 and the rear side surface of the hub portion 3b of the center piece 3. Those thrust bearings 39, 40 serve to restrict the axial movements of the boss 30, the damper device $12_1$ that is integrally formed thereto, and the connection plate 36 that is supported by the boss 30 that restricts its axial movement so as to be supported.

A spline 30e formed in the inner periphery of the boss 30 is engaged with the spline 28b formed in the input shaft 28. Therefore the boss 30 serving as the output member is connected to the input shaft 28 of the automatic transmission, having both sides directly supported by the housing 2 via the thrust bearings 39, 40, respectively. A sleeve shaft 41 having a predetermined gap a is supported by the input shaft 28 via a bush 42. A tip end of the sleeve shaft 41 is oil tightly fit with a hub portion 30f of the boss via an O-ring 43. A cylindrical portion 7b of the rear hub 7 is disposed at an outer radial side of the sleeve shaft 41 in the presence of a predetermined gap b. The cylindrical portion 7b is rotatively supported on a transmission case 45 via a bush 46. The portion defined by the transmission case 45 and the cylindrical portion 7b is oil tightly sealed with an oil seal 47. A portion of the sleeve shaft 41 in contact with the bush 42 has a plurality of concave grooves 49 extending in the axial direction.

Accordingly a first oil passage is formed between the sleeve shaft 41 and the input shaft 28 for communicating the oil passage within the transmission case and the housing of the clutch assembly, which is defined by the gap a, the concave grooves 49, and the spline 30e or 28b having its tooth partially cut. Meanwhile a second oil passage is formed of the gap b between the sleeve shaft 41 and the cylindrical portion 7b of the rear hub. This makes it possible to form a structure of the lubricating oil passage where the lubricating oil from the transmission case 45 is supplied from one of the first and the second oil passages into the housing 2, and the lubricating oil is then discharged from the other oil passage. The supplied lubricating oil lubricates the thrust bearings 39, 40, the clutch 10, the damper device $12_1$ and the like within the housing 2, and then discharged. In this case, portions between the outer peripheral surface 30a of the boss that functions as a surface to support the connection plate 36 and the inner peripheral surface 36b of the hub, and the collar portion 37a of the ring member that functions as the surface for supporting the intermediate plate 32 are sufficiently lubricated.

Figure 3:
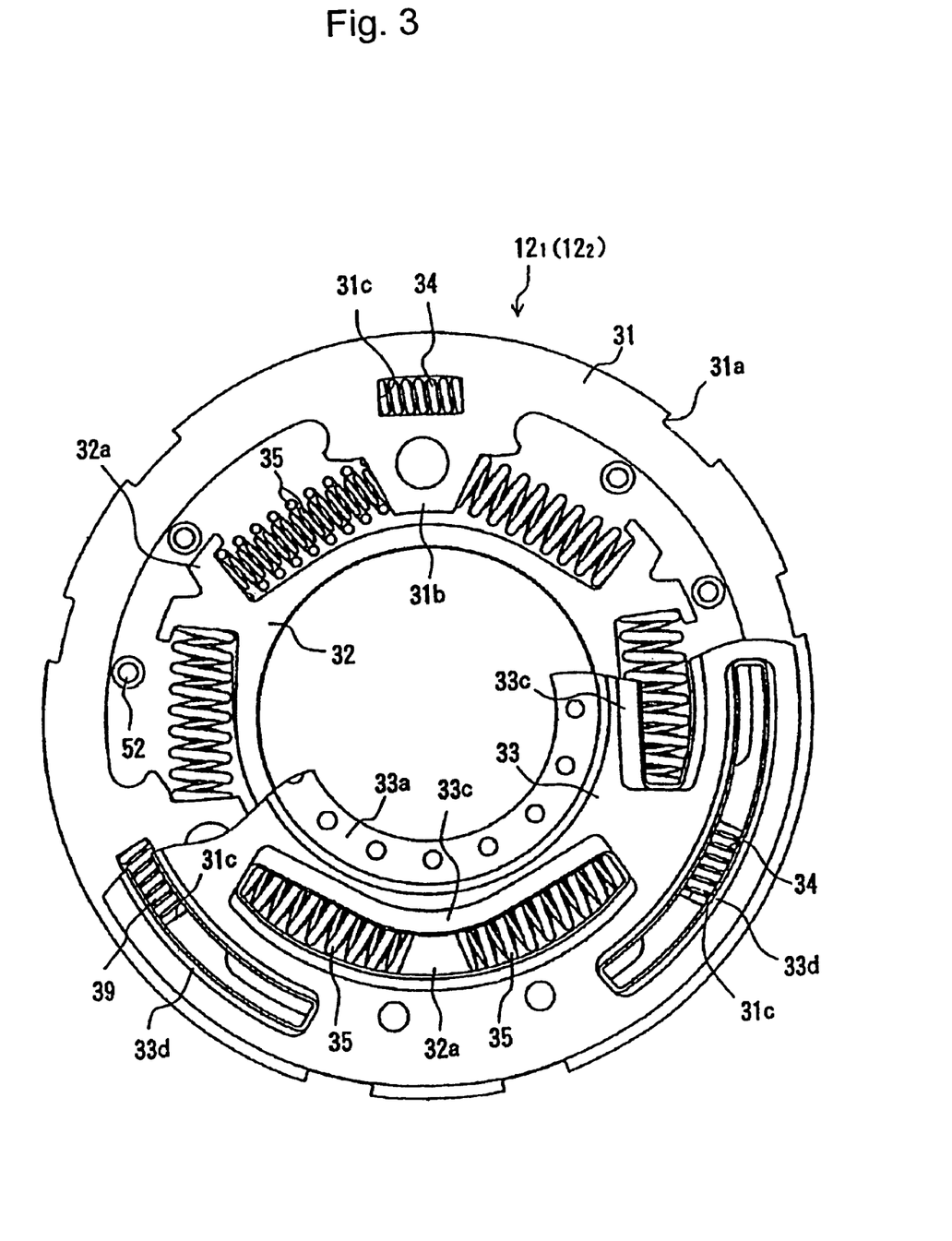
FIG. 3 is a partial broken view representing the front of a damper device of the clutch assembly.

FIG. 3 is a partial broken view representing the front of the damper device $12_1$ ($12_2$). The drive plate 31 formed into a ring shape has a concave-convex portion 31a formed on the outer periphery so as to be engaged with the connection plate 36. The drive plate 31 has a protruding portion 31b formed on the inner periphery, which extends toward the inner radial direction. The ring shaped portion of the drive plate 31 has a hole 31c that stores a coil spring (second spring) 34 with small diameter to which a predetermined pressure is applied. The intermediate plate 32 has a protruding portion 32a that extends toward the outer radial direction on its outer periphery. A first spring 35 formed of two coil springs are set under pressure between the protruding portions 31b and 32a. The driven plates 33 disposed on both sides of the drive plate 31 and the intermediate plate 32 and are connected and fixed to those plates 31, 32 with a pin 52 have spring housings 33c, 33d that store the first spring 35 and the second spring 34, respectively. A first spring housing 33c has a length enough to store two adjacent first springs 35. A second spring housing 33d has a length enough to include a predetermined allowance with respect to the second spring 34.

Therefore, in the damper device $12_1$, the rotation of the drive plate 31 is transmitted to the protruding portion 32a while applying the pressure force to the first spring 35 from the protruding portion 31b. The rotation transmitted to the protruding portion 32a of the intermediate plate 32 is further transmitted to the driven plate 33 via the spring housing 33c while applying the pressure force to the adjacent first spring 35. Those two first springs 35 as being serially arranged are operated via the intermediate plate 32 such that the rotation is transmitted to the driven plate 33 while absorbing the impact acting on the drive plate 31 over a long stroke (long travel).

A predetermined relative rotation between the drive plate 31 and the driven plate 33 caused by the two first springs 35 as being serially arranged serves to absorb the allowance between one end of the spring housing 33d and the second spring 34. Then the rotation of the drive plate 31 is transmitted to the driven plate 33 while applying pressure to the second spring 34 at the end of the housing. In addition to absorption of the predetermined torque upon compression of the first spring 35, the impact can be absorbed in the middle of the stroke with a greater resistance upon exertion of the compressive deforming force of the second spring 34. Each of the damper device $12_1$, $12_2$ has the intermediate plate 32 such that the first springs 35 act on the portions between the drive plate 31 and the intermediate plate 32, and between the intermediate plate 32 and the driven plate 33. The first and the second springs 35, 34 make it possible to increase the damper stroke so as to absorb the impact to the drive plate 31 over a relatively longer stroke upon transmission of the rotation to the driven plate 33. This makes it possible to absorb fluctuations in the torque owing to the engine operation or upon engagement of the clutch 10. In this embodiment, the stroke established by placing the first springs 35 to be on the inner radial side with respect to the second spring 34 may become longer than the stroke established by placing the first springs 35 on the outer radial side. This is because the resultant rotational angle becomes relatively greater when the spring is disposed on the inner radial side compared with the spring disposed on the outer radial side.

The clutch assembly $1_1$ according to the invention will be described. In the state where the vehicle is stopped, the oil pressure within the oil chamber 23 is released, the piston 20 is in a return position where the protruding portion $20_{c2}$ is brought into abutment on the front cover 5 by the return spring 26, and the clutch 10 is disengaged. In the aforementioned state, the housing 2, connected to the internal combustion engine, rotates along with the rotation of the engine. As the clutch 10 is disconnected, the rotation of the engine is not transmitted to the clutch hub 16. The input shaft 28 is, thus, in a stopped state. A predetermined low oil pressure may be applied to the oil chamber 23 in order to bring the clutch 10 into a slip state such that the creep torque is applied to the input shaft 28.

When a takeoff signal is output upon depression of the accelerator pedal by the vehicle operator, the valve (not shown) is operated so as to supply a predetermined oil pressure to the oil hole 28a of the input shaft 28. The oil pressure is then supplied to the oil chamber 23 through the oil holes 29a, 29b. This allows the piston 20 to move against the return spring 26, and its projecting portion 20c serves to press the clutch plates 14 and the clutch discs 13 to engage the clutch 10. At this moment, the reaction force of the clutch caused by the oil pressure acting on the oil chamber 23 directly acts on the disc portion 3c of the housing that forms the oil chamber, and the intermediate cylindrical portion 5b as the force in the opposite direction via the back-up plate 14b and the snap ring 14a. The reaction force, therefore, is absorbed within the housing 2 directly without acting on the members other than the clutch assembly.

Upon engagement of the clutch 10, the rotation of the housing 2 is transmitted to the damper device $12_1$ via the clutch hub 16 and the connection plate 36. The two adjacent first springs 35 arranged in series on the inner radial side serve to absorb the impact caused by the engagement of the clutch 10 over a long stroke. In the middle of the long stroke, the second spring 34 disposed on the outer radial side serves to absorb further impact. The rotation is then transmitted to the driven plate 33, and further to the input shaft 28 from the boss 30 that is integrally combined with the driven plate 33. The damper device $12_1$ having a larger radial size is stored in the large-diameter storage space A of the housing 2. The impact absorption over the long travel performed by the first springs 35 arranged in series, and the increase in the load of impact absorption performed by the second spring 34 in the middle of such long stroke make it possible to enhance the effect of absorbing the impact load exerted by the clutch 10.

When the torque is brought into the steady state after the impact absorption, the springs 34, 35 of the damper device $12_1$ are released from the compression deformation to the normal states such that the rotation is transmitted in a substantially uniform condition. In this case, the hub portion 36b of the connection plate 36 is axially oriented so as to be supported on the outer periphery 30a of the boss 30. During the stroke traveling where the impact is absorbed by the damper device, the outer periphery 30a rotates relatively to the hub portion 36b along with the relative rotations between the drive plate 31 and the driven plate 33. In the normal rotating state, however, the hub portion 36b and the outer periphery 30a substantially rotate in an integrated manner.

Accordingly, the connection plate 36 is supported on the outer periphery 30a of the boss for most of the times. The connection plate 36 does rotate relative to the outer periphery 30a at a time of the impact absorption performed by the damper device. However, as the period taken for the relative rotation is rather short, and the aforementioned relative rotation is performed in a sufficiently lubricated condition, the connection plate 36 can be supported with no problems.

Likewise, the intermediate plate 32 is supported on the ring member 37 integrated with the boss 30. As the stroke and the stroke time of the intermediate plate 32 is shorter than that of the drive plate 31, that is, the connection plate 36 integrated therewith and the relative rotation is performed in a sufficiently lubricated condition, those plates 32, 31 can be supported with no problems.

A space C is defined by the cylindrical portion 5b and the outer periphery 5d of the front cover 5 in the housing 2. The space C is blocked by welding a lid member 55 to the front cover 5. A flexible plate is connected to a screw hole 55a such that the lid member 55 is connected to the internal combustion engine. The space C may be held in a hollow state. Alternatively, a predetermined load may be filled in the space C in case of necessity so as to enhance the flywheeling effect of the housing 2. A motor-generator may be mounted in the space C so as to be employed as the drive unit for a hybrid vehicle (including an idling stop control). A ring gear 56 employed for an engine start-up device is also provided as shown in the figure.

A clutch assembly $1_2$ including a one-way clutch according to another embodiment will be described referring to FIG. 2. This embodiment is substantially the same as the embodiment as described above except that the one-way clutch is provided. As other elements are the same as those of the above-described embodiment, the main elements are designated as the reference numerals that are the same as those of the embodiment. The descriptions of those elements, thus, will be omitted.

The rear portion of the boss 30 that supports the connection plate 36 is deeply cut, and the concave portion 30g receives a one-way clutch 60. An inner peripheral surface of an inner peripheral hub portion 30f is engaged with the input shaft 28 with splines 30e, 28b. The one-way clutch 60 includes an outer race 61, a sprag 62, an inner race 63, and left and right side plates 65, and is positioned such that the outer race 61 is fit within the concave portion 30g of the boss 30.

Like the ring member 37 in the aforementioned embodiment, the rear portion of the outer race 61, that is, a ring extending portion (ring portion) 61a extending toward the outer radial direction is fixed to the boss 30 together with the extending portion 33a of the driven plate by the rivet 38. The outer periphery of the ring extending portion 61a has a collar shape, which abuts on the intermediate plate 32 so as to be supported. The inner race 63 has a sleeve 63a with the inner circumference axially extending. The inner peripheral surface of the sleeve 63a is fit with the sleeve shaft 41 and engaged with splines 63b, 41b. Meanwhile, the boss 30 has a collar (protrusion) 30a on a tip end of the outer peripheral surface (supporting portion) 30a. The hub 36b of the connection plate 36 is slidably supported on the outer peripheral surface, and is sandwiched between the collar portion 30a and the extending portion 33a of the driven plate so as to be supported and restricted with respect to its axial movement.

The sleeve shaft 41 has a hole 41c through which the input shaft 28 is communicated with the gap a of the sleeve shaft 41, and the sleeve shaft 41 and the gap c of the sleeve 63a.

This makes it possible to form a first oil passage that passes through the gap a, the hole 41c, the gap c and the spline 63b or 41b having a portion where a tooth is partially cut, and a second oil passage that passes the gap b. The first oil passage is communicated with the front side surface of the one-way clutch 60, and with the housing 2 via the spline 30 having a cut portion or the spline 28b and the thrust bearing 40. The resultant lubricating oil passage that includes the first and the second oil passages is communicated with the housing 2 of the clutch assembly $1_2$ from the transmission case 45.

The sleeve shaft 41 connected to the inner race 63 of the one-way clutch 60 via the sleeve 63a is connected to a predetermined element of the device for selecting the speed among the forward and reverse speeds in the continuously variable transmission. The one-way clutch 60 is structured to restrict the rotation opposite to the running direction in the forward or the reverse range selected by the vehicle operator. In the case where the D range as the forward range is selected, the one-way clutch 60 restricts the rotation in the reverse direction so as to prevent the vehicle that stops uphill from being moved backward. In the case where the reverse range is selected, the one-way clutch 60 restricts the forward direction so as to prevent the vehicle that stops downhill from being moved forward.

Referring to FIG. 4, further embodiment that has been partially modified will be described. The clutch assembly of the modified embodiment has the damper device that is substantially the same as that of the embodiment as shown in FIG. 1. However, as the input (drive) member and the output (driven) member are reversed in the modified embodiment, the connection of those members, thus, is different from that of the aforementioned embodiment. As other elements of the embodiment are substantially the same as those of the aforementioned embodiment, the main portions are designated as the same reference numerals. The description of those portions, thus, will be omitted.

The clutch hub 16 of the clutch 10 has a spline 16a that brings the clutch discs 13 into engagement at the outer radial side. The spline 16a further extends to form an integrated clutch hub member 16b having a cylindrical hub 16c formed on its end. An extending portion 33a of the drive plate 33 is integrally fixed to the extending portion (input member) 16b as the integrated member with the rivet 70 and the like.

The boss 30 serving as the output member has a cylindrical support portion (outer peripheral surface) 30a formed on a front end, and a connecting portion 30f as an extended rear end toward an outer radial direction. The end of the connecting portion 30f is bent in the axial direction to form an edge portion (protrusion) 30g. A connection plate 73 is fixed to be integrated with the connecting portion 30f with the rivet 72. The connecting portion 30f is engaged with a concave/convex portion 31a of the driven plate 31 by a notch 73a formed on the end of the connection plate 73. A thrust washer (latch member) 76 is fastened to the end of the support portion 30a of the boss 30 with the snap ring (lock member) 75.

The hub portion 16c of the clutch hub integrated member 16b integrally combined with the drive plate (drive member) 33 is slidably supported on the support portion (outer peripheral surface) 30a of the boss 30. One end of the hub portion 16c abuts on the thrust washer 76, and the other end abuts on the tip of the edge portion 30g of the boss 30. Accordingly, the integrated member 16b is supported while being restricted with respect to the axial movement.

The torque from the clutch hub 16 is transmitted to the drive plate 33 in the damper device $12_2$. The damper device $12_2$ absorbs the impact caused by the engagement of the clutch 10 over a long stroke by means of two first springs 35 disposed in series on the inner radial side. The damper device $12_2$ further absorbs the impact in the middle of the long stroke by means of the second spring 34 disposed on the outer radial side. The torque is, then, transmitted to the driven plate 31, and further to the boss 30 via the connection plate 73.

In each of the clutch assemblies $1_1$, $1_2$, and $1_3$, the clutch 10 is engaged/disengaged for connecting engine outputs to the input shaft 28 of the automatic transmission so as to start the vehicle without using the torque converter (T/C). The resultant transmission efficiency can be improved by reducing slip between input and output members employed in the torque converter. The present clutch assembly has the oil chamber 23 formed by fitting the piston 20 of the clutch 10 oil tightly with the housing 2. Therefore, no leakage of oil from the oil chamber 23 to the housing 2 occurs, improving controllability of the clutch 10. The present clutch assembly has a simple structure that does not require the clutch case formed of the member other than the housing 2, which is employed for the clutch or the hydraulic actuator, thus improving reliability of the assembly. As each of the damper devices $12_1$, $12_2$ is aligned in the axial direction with the clutch 10 and the input shaft 28 (lateral direction of the drawings as shown in FIGS. 1, 2, and 4, respectively), the position of the damper spring may be freely determined in the radial direction (longitudinal direction of the drawings as shown in FIGS. 1, 2, and 4, respectively) of the damper devices $12_1$, $12_2$. This makes it possible to increase the degree of freedom in designing the damper devices $12_1$ and $12_2$.

The oil chamber 23 defined by the piston 20 and the housing 2 is disposed to be overlapped with the clutch plates 14 and the clutch discs 13 at the inner circumference thereof in the axial direction. As the clutch 10 and each of the damper devices $12_1$, $12_2$ are aligned in the axial direction, the length of the housing 2 in the axial direction is increased. However, such increase in the length can be kept to the minimum value.

The housing 2 includes a connecting portion formed of the lid member 55 connected to an engine crank shaft (not shown), a front cover (first housing member) 5 to which the connecting portion is fixed, and a second housing member formed of a center piece 3 connected to the front cover 5, a rear cover 6 and a rear hub 7. As the clutch plates 14 are fit with the spline 15 of the front cover 5, the engine output torque is not transmitted through the welded points (bonded points) j1, j2 between the first housing member 5 and the second housing member 3, 6, 7. As a result, the strength of the housing 2 formed of a plurality of members may be easily established.

The piston 20 is oil tightly fit with the center piece 3 or the like that forms the second housing member such that the clutch plates 14 and the clutch discs 13 are pressed upon supply of the oil pressure to the oil chamber 23 defined by the piston 20 and the center piece 3. That is, the portion at which the front cover 5 and the center piece 3 are bonded is not formed within the oil chamber 23. Therefore, even if a relatively higher oil pressure acts on the oil chamber 23, the leakage of the oil may be reliably prevented.

Each of the damper devices $12_1$, $12_2$ includes the drive plate 31, the driven plate 33, the first springs 35 that act between the drive plate 31 and the driven plate 33, and the second spring 34 that acts between the drive plate 31 and the driven plate 33 with a predetermined allowance. Then the drive plate 31 is connected to the clutch hub 16, and the driven plate 33 is connected to the boss 30. This makes it possible to align the clutch 10 and the damper device $12_1$ or $12_2$ in the axial direction even if the first and the second springs 35, 34 are disposed for providing the damper characteristics. Therefore, the increase in each size of the clutch assemblies $1_1$, $1_2$, $1_3$ in the radial direction may be prevented.

INDUSTRIAL AVAILABILITY

The clutch assembly according to the present invention is useful as being employed for various types of vehicles having an internal combustion engine and an automatic transmission. It is preferable to apply the present invention especially to the clutch assembly that is demanded to have a simple structure and a high reliability.

What is claimed is:

1. A clutch assembly comprising:
a clutch and a damper device housed in a housing that is connected to an engine output member, and an output member connected to an input shaft of an automatic transmission, the clutch assembly performing connection and disconnection of an output of an engine fed to the input shaft of the automatic transmission by engaging and disengaging the clutch, wherein:
the clutch includes a first friction member, a second friction member, and a piston that is oil tightly fit with the housing so as to apply pressure to the first and the second friction members; and
the damper device includes an elastic member that is axially aligned with the first and the second friction members, and the damper device has one end connected to a clutch hub that supports the second friction member and another end connected to the output member,
wherein:
the input shaft of the transmission is engaged with an inner peripheral surface of the output member with a spline;
a sleeve shaft is fit with the input shaft with a first gap so as to be fit with the output member oil tightly;
a hub constituting the housing is oil tightly and rotatively supported on a transmission case of the transmission with a second gap formed on an outer radial side of the sleeve shaft; and
the first gap and the second gap form a lubricating oil circulation passage in the housing.

2. The clutch assembly according to claim 1, further comprising an oil chamber formed between the piston and the housing so as to be overlapped with the first and the second friction members at a side of inner circumferences thereof in an axial direction.

3. The clutch assembly according to claim 1, wherein:
the housing includes a connecting portion connected to the engine output member, a first housing member to which the connecting portion is fixed, and a second housing member connected to the first housing member; and
the first friction member is fit with a spline formed on the first housing member.

4. The clutch assembly according to claim 3, wherein the piston is oil tightly fit with the second housing member for applying pressure to the first and the second friction members upon supply of an oil pressure to the oil chamber formed between the piston and the second housing member.

5. The clutch assembly according to claim 1, wherein:
the damper device includes a drive plate, a driven plate, a first spring functions between the drive plate and the driven plate, and a second spring that functions between the drive plate and the driven plate with a predetermined allowance; and the drive plate is connected to the clutch hub and the driven plate is connected to the output member.

6. The clutch assembly according to claim 5, wherein:
the damper device further includes an intermediate plate; and the first spring functions in a serial manner between the drive plate and the intermediate plate, and between the intermediate plate and the driven plate.

7. The clutch assembly according to claim 6, wherein the first spring is disposed at an inner radial side of the damper device with respect to the second spring.

8. The clutch assembly according to claim 1 further comprising a one-way clutch fit into a concave portion formed on one side of the output member by fixing an outer race thereto, wherein:

a sleeve is formed on an inner race of the one-way clutch;
the sleeve formed on the inner race is fit with the sleeve shaft so as to be engaged with a spline; and
a communication hole is formed on an end of the sleeve shaft such that the first gap and the second gap form the lubricating oil circulation passage in the housing.

9. The clutch assembly according to claim 1, wherein:
the housing includes a side surface, the hub, and a cylindrical portion which are integrated with the side surface thereof;
an outer friction plate serving as the first friction member and an inner friction plate serving as the second friction member are engaged with a spline disposed on the inner peripheral side of the cylindrical portion and with a spline disposed on an outer peripheral surface of the clutch hub, respectively so as to form the clutch of a wet multiple disk type;
an oil passage formed on the hub is communicated with an oil chamber defined by a side surface of the housing and the piston; and
the piston serves to apply pressure to the clutch, and resultant counter force of the clutch is directly supported by the housing.

10. The clutch assembly according to claim 9, wherein:
the cylindrical portion comprises an intermediate cylindrical portion that is formed on an intermediate portion to the front of the housing in the radial direction;
the side surface of the housing comprises a flat plate-like member that is disposed on an inner radial side of the intermediate cylindrical portion; and
the damper device is stored in a large-diameter storage portion formed to the rear of the housing, and a hydraulic actuator formed of the clutch, the piston, and the oil chamber is disposed in a small-diameter storage portion, and formed on an inner radial side of the intermediate cylindrical portion to the front of the housing.

11. The clutch assembly according to claim 9, wherein a retainer plate is fixed to the hub of the housing, and a return spring is disposed under pressure between the retainer plate and a back surface of the piston.

12. The clutch assembly according to claim 9, wherein the spline used for engaging the outer friction plate of the clutch is directly formed on an inner peripheral surface of the cylindrical portion in the housing.

13. The clutch assembly according to claim 9, wherein:
a concave portion is formed on an end surface of the hub of the housing such that the input shaft of the transmission is oil tightly fit with the concave portion; and an oil hole that extends in an axial direction is formed in the input shaft, and an end opening of the oil hole is communicated with the oil passage formed in the hub.

14. The clutch assembly according to claim 9, wherein:
the piston has an operating portion that extends toward an outer radial direction such that the clutch is operated; and the operating portion abuts on an inner surface of the housing upon disengagement of the clutch, and has an outer circumference engaged with a spline on an inner peripheral side of the cylindrical portion.

15. The clutch assembly according to claim 1, wherein:
the clutch includes at least one friction plate comprising the first friction member that is engaged with a spline for rotating integrally with the housing, and at least one inner friction plate comprising the second friction member that is engaged with a spline formed on a clutch hub, which are alternately disposed;
the damper device includes a drive member, a driven member, and a spring disposed on a power transmission path from the drive member to the driven member;
the damper device further includes a boss serving as the output member connected to the driven member, and an input member integrally combined with the clutch hub and connected to the drive member; and
an inner peripheral surface of the input member is slidably supported directly on an outer peripheral surface of the boss in a rotating direction while being restricted with respect to an axial movement.

16. The clutch assembly according to claim 15, wherein:
the input member has a cylindrical hub portion on an inner peripheral surface thereof;
the boss includes a cylindrical support portion that supports the hub portion, a protruding portion formed on one end of the support portion in an axial direction and protruding in an outer radial direction, and a restricting member formed on another end of the support portion in the axial direction and protruding in an outer radial direction of the support portion while being restricted with respect to at least a movement in the axial direction; and
the input member is slidably supported on the support portion of the boss and interposed between the protruding portion and the restricting member so as to be restricted with respect to the movement in the axial direction.

17. The clutch assembly according to claim 16, wherein the protruding portion of the boss comprises a collar portion integrally formed with the cylindrical support portion, and the restricting member comprises an extending portion of the driven member fixed at the boss.

18. The clutch assembly according to claim 17, wherein the input member comprises a connection plate that serves to fix the clutch hub, extends in a radial direction to be connected to the drive member on an outer radial portion thereof, and forms the hub portion on an inner radial portion thereof.

19. The clutch assembly according to claim 16, wherein:
the driven member comprises two driven plates that interpose the drive member and the spring;
at least one of the two driven plates is fixed to the boss; and
an inner peripheral surface of the drive member is slidably supported directly on an outer peripheral surface of a ring portion integrally formed with the boss.

20. The clutch assembly according to claim 19, wherein:
the damper device comprises a drive plate, an intermediate plate, a driven plate, a first spring functioning in a serial manner between the drive plate and the intermediate plate, and between the intermediate plate and the driven plate, respectively, and a second spring functioning between the drive plate and the driven plate with a predetermined allowance; and
the drive plate comprises the drive member connected to the input member, and the intermediate plate comprises the drive member supported on the ring portion.

21. The clutch assembly according to claim 20, wherein the ring portion is formed on an outer race of a one-way clutch disposed in a concave portion of the boss so as to protrude toward an outer radial direction.

22. The clutch assembly according to claim 16, wherein the protruding portion of the boss comprises a connecting portion of the driven member integrally formed with the boss, and the restricting member comprises a lock member that is fixed to the support portion.

23. The clutch assembly according to claim 22, wherein the input member comprises a clutch hub integrated member that is integrally formed with the clutch hub, and connected to the drive member on an inner radial portion so as to form the hub portion.

24. The clutch assembly according to claim 23, wherein:
the drive member comprises two drive plates that interpose the driven member and the spring;
one of the two drive plates which locates at the clutch hub is fixed to the clutch hub integrated member;
a connection plate that extends toward a radial direction is provided so as to connect the driven member and the boss; and
an inner peripheral surface of the drive member is slidably supported on an outer peripheral surface of the ring portion integrally combined with the boss.

25. The clutch assembly according to claim 24, wherein:
the damper device comprises a drive plate, an intermediate plate, a driven plate, a first spring functioning in a serial manner between the drive plate and the intermediate plate, and between the intermediate plate and the driven plate, respectively, and a second spring functioning between the drive plate and the driven plate with a predetermined allowance; and
the drive plate comprises the drive member connected to the input member, and the intermediate plate comprises the drive member supported on the ring portion.

26. The clutch assembly according to claim 25 wherein the ring portion is formed on an outer race of a one-way clutch disposed in a concave portion of the boss so as to protrude toward an outer radial direction.

27. The clutch assembly according to claim 15, wherein:
the housing has a large-diameter storage portion on one side, and a small-diameter storage portion on the other side; and
the large-diameter storage portion stores the damper device and the input member, and the small-diameter storage portion stores the clutch and a hydraulic actuator.

28. The clutch assembly according to claim 1, wherein said elastic member is a spring.

29. A clutch assembly comprising:
a clutch and a damper device housed in a housing that is connected to an engine output member, said clutch having a first friction member and a second friction member,
an output member connected to an input shaft of an automatic transmission and having both sides directly supported on the housing via a bearing, and
a take-off controller that transmits an output of the engine to the automatic transmission by engaging the clutch so as to start a vehicle, wherein,
the damper device includes a drive plate connected to an output member of the clutch, a driven plate connected to the output member, a first spring functioning in a serial manner between the drive plate and the driven plate, and a second spring functioning between the drive plate and the driven plate with a predetermined allowance, and the first spring is disposed at an inner radial side of the damper device with respect to the second spring; and
one of the first and the second springs being arranged in the radial direction so as to be aligned with the first and second friction members in an axial direction,
wherein:
the input shaft of the transmission is engaged with an inner peripheral surface of the output member with a spline;
a sleeve shaft is fit with the input shaft with a first gap so as to be fit with the output member oil tightly;
a hub constituting the housing is oil tightly and rotatively supported on a transmission case of the transmission with a second gap formed on an outer radial side of the sleeve shaft; and
the first gap and the second gap form a lubricating oil circulation passage in the housing.

* * * * *